United States Patent [19]

Kleinwolterink, Jr.

[11] Patent Number: 5,050,695

[45] Date of Patent: Sep. 24, 1991

[54] POWER ATTACHMENT FOR WHEELCHAIR

[76] Inventor: Henry Kleinwolterink, Jr., Sheldon, Iowa

[21] Appl. No.: 552,982

[22] Filed: Jul. 16, 1990

[51] Int. Cl.[5] .................... B62D 1/02

[52] U.S. Cl. .................... 180/13; 180/907

[58] Field of Search .................... 180/12, 13, 214, 907

[56] References Cited

U.S. PATENT DOCUMENTS

| | | | |
|---|---|---|---|
| 2,635,703 | 4/1953 | Goeller | 180/13 |
| 2,978,053 | 4/1961 | Schmidt | 180/12 |
| 3,349,862 | 10/1967 | Shirey | 180/214 X |
| 4,386,672 | 6/1983 | Coker | 180/13 |
| 4,750,578 | 6/1988 | Brandenfels | 180/13 |

FOREIGN PATENT DOCUMENTS

| | | | |
|---|---|---|---|
| 2124985 | 2/1984 | United Kingdom | 180/907 |

*Primary Examiner*—Kenneth R. Rice
*Assistant Examiner*—Paul Dickson

[57] ABSTRACT

A powered unit for adding motive power to a wheelchair comprising a frame adapted for easy attachment to the chair and steerable motive means powered preferably by an electric motor and including a wheel adapted to pull and to steer the chair.

4 Claims, 3 Drawing Sheets

FIG. 3
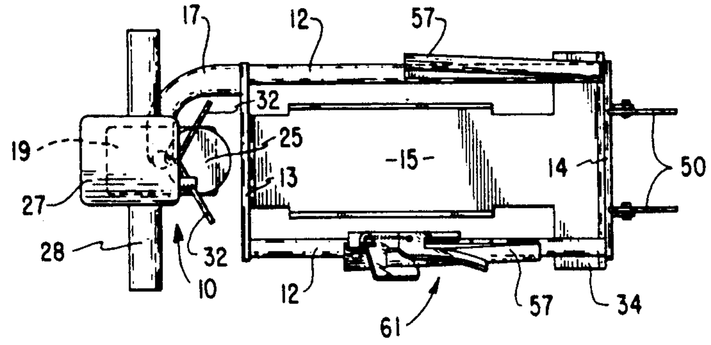
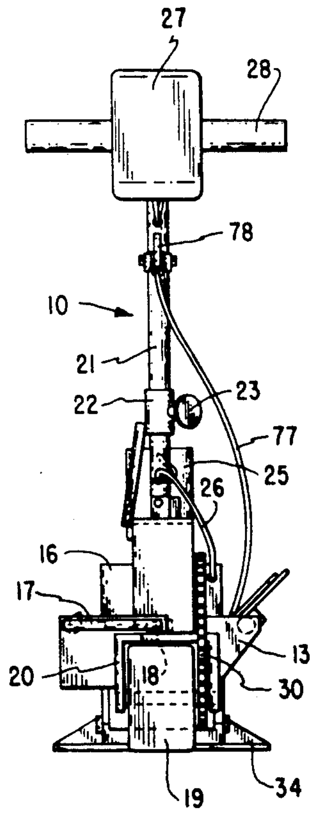
FIG. 2
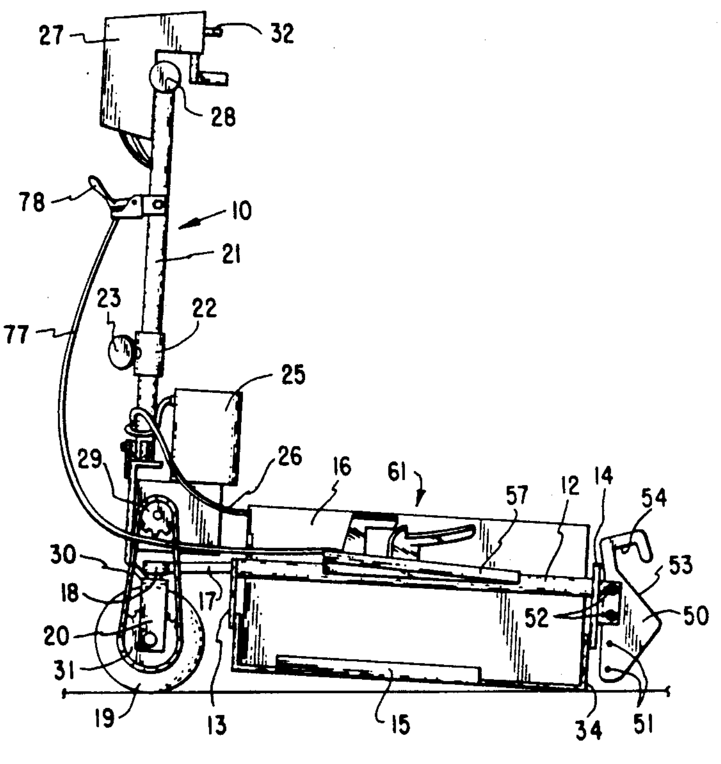
FIG. 1

POWER ATTACHMENT FOR WHEELCHAIR

BACKGROUND AND SUMMARY OF THE INVENTION

This invention pertains to motorized wheelchairs and more particularly to a device adapted to be attached easily to an ordinary wheelchair to convert it to a powered chair.

For most paraplegics, an ordinary arm-powered wheelchair will provide sufficient mobility to cover short distances such as within a home. However, in current times, most paraplegics do not want to be homebound but prefer to get out to do such other tasks as grocery or other shopping, going to the theater or the like. Sometimes such activities require relatively long distances of travel in parking lots or malls. While arm-powered chairs will provide mobility, such motion may be quite tiring. Further, arm-power requires two fully functioning and reasonably strong arms.

Motorized arm chairs are available. They are relatively expensive and require purchase of a full unit.

By my invention I provide a motorizing unit capable of easy attachment and release from an ordinary wheelchair—only slightly modified. The unit can be attached and released without moving from the chair, and after attachment will fully motorize the chair to become the substantial equivalent of a motorized chair.

BRIEF DESCRIPTION OF THE DRAWINGS

FIG. 1 is a side elevational view of the motorizing unit apart from the chair,

FIG. 2 is a front elevational view of the unit as shown in FIG. 1,

FIG. 3 is a top view of the unit with the batteries removed,

DESCRIPTION

Figure 4:
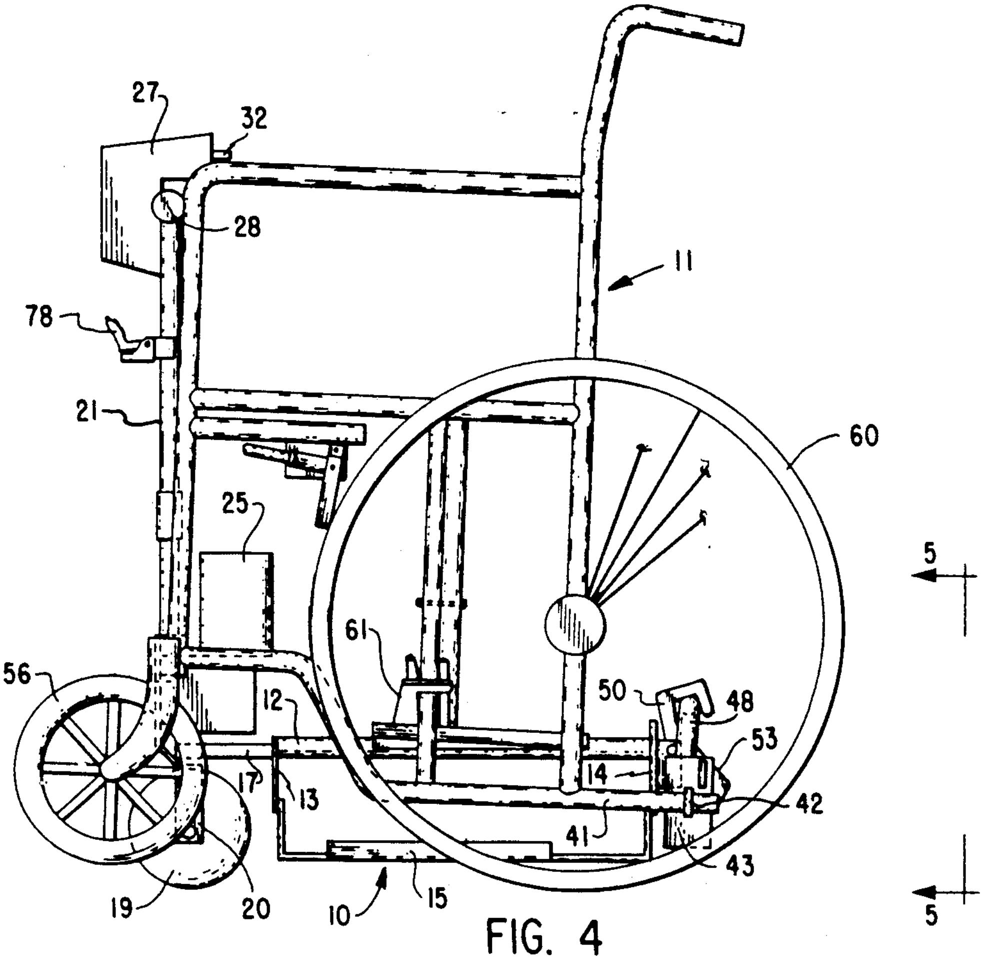
FIG. 4 is a side-elevational view of the unit in place connected to a wheelchair.

Briefly my invention comprises a motorizing unit for a wheelchair. The unit also has a unique latching device for attachment to the chair which makes attachment and release very easy for the user.

More specifically and with reference to the drawings, the device consists of a motorizing unit 10 adapted for releasable attachment to an ordinary wheelchair 11. The unit 10 includes a frame composed of two upper rails 12 connected to a front wall 13 and rear wall 14. A battery-carrying pack 15 is suspended from the frame and carries the batteries 16 required to operate the device.

At the front end of the frame, a bracket 17 arcuate in plan-form extends forward and carries a bearing 18 at its outer end. A front wheel 19 having a broad, friction producing tire is journalled in a fork 20 which, in turn, is mounted in the bearing 18 for steering. A steering column 21 extends upward from the fork 20. This column, as shown in FIGS. 1 and 2, may be made adjustable in height by using telescoping tubes and a collar 22 on one tube with a set screw 23 to hold the collar in a fixed relation to the other tube.

A geared electric motor 25 is also mounted on the column 21. This motor is energized from batteries 16 through a cable 26, and is controlled through a control box 27 at the top of the column 21. Steering is accomplished by means of handle bars 28. The drive from the motor 25 to the wheel 19 is preferably through a sprocket and chain arrangement including the motor sprocket 29, the drive chain 30 and the wheel sprocket 31. The control box 27 should include both control for the speed of the motor and its direction so that the device is reversible. Control may be through wings 32 extending from the box 27 and in operating relation to proper switches within the control box. By this means, even someone having only partial control of his or her limbs will be able simply to push one of the wings for operating of the controls and will not have to rely on fine wrist of finger movement.

The power unit thus far described is a free standing unit capable of standing by itself when stabilized by a trapezoidal rear stand 34 attached to the rear plate 14. The stand simply supports the power unit although it may be provided with a lower surface made from rubberized material, felt or similar fabric, to avoid damage to floors.

In order to be useful with a wheelchair, it is necessary that there be a convenient means for attachment of the power unit to the chair. The means should be operable by a paraplegic from the wheelchair and should not require great strength to operate. Nor should the connecting means require substantial alterations to the wheelchair. That chair should continue to be operable as a separate device so that it can be used beside a desk or table without interference from a steering device.

The attachment means on the present device accomplishes the above described desiderata. The only modification to the wheelchair 11 is the provision of a pair of tiltable socket members 40. These members are mounted on the lower frame members 41 of the wheelchair. The mounting may be done by using a telescoping collar 42 permanently fixed to the member 41. The collar 42 carries a plate 43 to which is pivotally attached the socket member 40. That member preferably includes a plate 44 having a sector cut out so that pivotal movement will be limited by contact of the edges 45 of the sector engaging a pin 46 (see FIG. 10).

Figure 5:
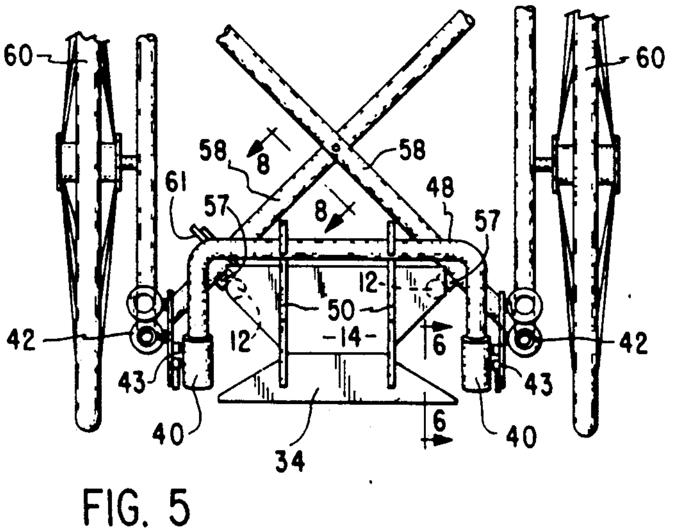
FIG. 5 is a partial view from line 5—5 of FIG. 4.
Figure 6:
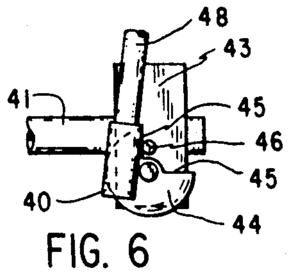
FIG. 6 is a partial side view from line 6—6 of FIG. 5.
Figure 7:
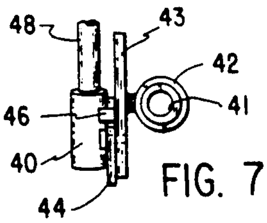
FIG. 7 is an end view of the parts shown in FIG. 6.
Figure 10:
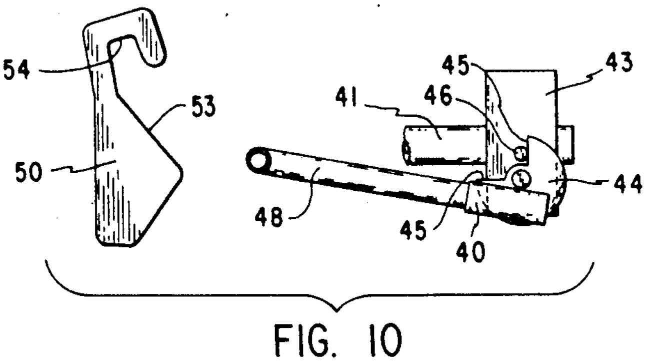
FIG. 10 is a partial view of the rear hook device and the lifting bar of the chair showing the hook on the motorizing unit about to engage the lifting bar on the chair.

An inverted U-shaped cross bar 48 is removably slid into the two socket members 40, so that the bar can move from a lower position shown in FIG. 10 to an upper position shown in FIGS. 4 and 5.

A pair of hook members 50 are fixed to the rear of the motorizing unit 10. As illustrated in FIG. 1, these may be made vertically adjustable by using a series of holes 51 through which screws 52 may extend. These hook members include a cam surface 53 in position to engage the cross bar 48 to guide that bar into the hook 54.

Figure 9:
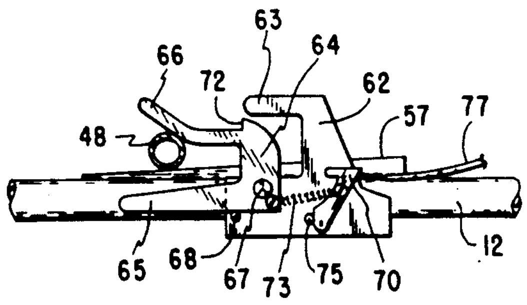
FIG. 9 is a view of the device shown in FIG. 8 with the latch in the opened position.
Figure 8:
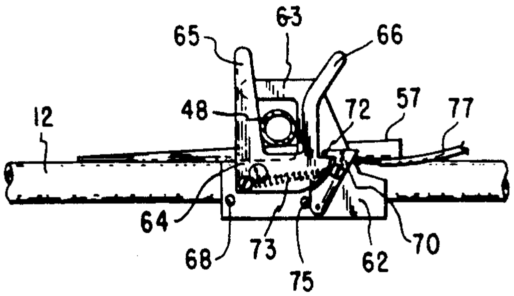
FIG. 8 is a view of the latching device from line 8—8 of FIG. 5 showing the latch in a closed position.

Another necessary part of the attachment means includes some provision to raise the front wheels 56 of the wheelchair so that the wheel 19 will be the support of the front of the chair and will have sufficient friction to pull the chair. On my device as adapted for most chairs, I simply provide pads 57 on the motorizing unit in position to engage the frame of the chair. With the usual collapsing chair, the engagement is with the diagonal braces 58. When the unit 10 is standing alone, these pads, even if uniform in thickness, will slope upward (See FIG. 1), but if added slope is needed, they may also be tapered as shown (FIGS. 8 and 9). A latch, later described, will hold the assembly together.

Coupling the motorizing unit 10 to the chair 11 is now accomplished quite simply. The unit 10 is allowed to stand free and in the relative open. The chair, with its occupant seated in a normal way, is rolled onto the unit from the rear. Because of the open construction of nearly all chairs, the first contact is made between the braces 58 and the pads.

Because of friction between the surface and the stand 34 and because the wheel 19 will not normally turn against the load of the geared motor 25, the chair 11 will normally ride up on the pads. This is also true because usually, the front wheels 56 of the chair are relatively lightly loaded.

As the chair moves forward relative to the motorizing unit, the bar 48 at the rear of the chair moves into engagement with the surface 53 on the hook member 50. The bar slides up into the hook 54 and with further movement tilts upward carrying the hook and the battery frame 15 at the rear of the unit upward until it reaches the position shown in FIG. 4. In this position the assembly is resting on the large rear wheels 60 of the wheelchair 11 and on the drive wheel 19 of the motorizing unit. Now actuation of the motor to drive the wheel 19 will move the chair as a motorized unit.

In order to hold the unit together, a latch 61, best shown in FIGS. 8 and 9, is provided on the unit 10. The latch includes a holding plate 62 attached to one of the rails 12 near the pad 57. A finger 63 on the plate extends rearward approximately parallel to the rail 12. A latch member 64 of roughly U-shape is pivotally mounted on the plate 62. This latch member includes a holding leg 65 and a cam leg 66 joined together at the base. The pivot point 67 is on the base. As the bar 48 is carried forward (to the right in FIGS. 8 and 9) the cam leg 66 is engaged as shown in FIG. 9. Further movement causes the bar to engage the base of the latch member 64 and trip it upward to the position of FIG. 8. In this position, the bar 48 is completely held between the holding leg 65 and the finger 66. A peg 68 is used to prevent the latch member from falling beyond into open position (FIG. 9).

The latch member is held in the closed position (FIG. 8) by a pawl 70 engaging a latch point 72 on the member 64. That engagement is caused by the bias of a spring 73 engaged betweenn the edge of the latch member 64 and the pawl 70. A peg 75 prevents over travel of the pawl. Because of the positions of attachment of the spring 73 as shown, the action of the spring tends both to hold the pawl 70 in latched engagement and to pull the latch member 64 down when the pawl 70 is released. That release is accomplished by pulling a cable 77 using a control lever 78 on the steering column 21.

Thus, by rolling the chair onto the motorizing unit, the contact of the hooks 54 with the bar 48 and subsequent swinging upward of that bar raises the battery case form the surface and carries the stand 34 upward so that the weight of the rear part of the motorizing unit is now borne by the large wheel 60 of the chair. Further, the contact between the members 58 on the chair with the pads 57 raises the front wheels 56 of the chair off the surface. Thus, the chair and the motorizing unit are now supported by the drive wheel 19 of the unit 10 and the large rear wheels 60 of the chair. The two units are latched together and the entire assembly operates as a motorized chair.

When it is desired to separate the units, as when the chair is to be brought to a desk or table, it is a simple matter to use the control lever 78 to release the latch member 64. The large wheels 60 can then be set by the normal brakes on the wheelchair. As the motorizing unit 10 is run forward under its own power. The pads 57 are pulled away by this movement, thus allowing the front wheels to settle back to the surface. At the same time, the bar 48 swings down to allow the rear of the frame 12 to settle with the stand 34 again resting on the surface. The chair can then be rolled away from the motorizing unit so that there is no longer a steering column interfering with the approach to the desk as there could be if using a permanently motorized chair.

It will also be apparent that the separated units will also be much more convenient to transport in an automobile since the chair can be separated and folded, and because the motorizing unit is relatively narrow. The total device can thus be moved as two pieces, or, in instances were it is not needed, the motorizing unit could be left behind and only the chair transported. Thus, substantial flexibility is possible with the new unit.

I claim as my invention:

1. In combination with a wheelchair adapted to run on a surface and having a chair frame with large rear wheels and castoring front wheels mounted on said chair frame, a motorizing unit having means engaged with said chair frame to raise and support said front wheels above said surface, stand means on said motorizing unit to support said unit apart from said chair, a power drive wheel on said unit, said chair including bar means pivotally attached to said frame, hook means on said motorizing unit and adapted to engage said bar means to lift said unit so that said stand is above said surface and latch means engageable between said chair and said motorizing unit whereby said chair when latched to said unit is supported by said large wheels and said power driven wheel.

2. The combination of claim 1 in which the frame of said chair is adapted to be collapsed, said bar means to lift the unit including pivoting means on said chair frame and a bar removably engaged with said pivoting means, said bar being engageable with hook means on said unit whereby pivoting of said pivoting means is effective to raise said stand.

3. The combination of claim 2 in which said steering means includes a vertically adjustable column whereby the upper part of said column may be located for the convenience of the user of said chair.

4. The combination of claim 2 in which said hook means are fixed to said unit and include cam surfaces engageable with said bar to guide said bar into hooked engagement with said hook means.

* * * * *